US010387209B2

(12) United States Patent
Bivens et al.

(10) Patent No.: US 10,387,209 B2
(45) Date of Patent: Aug. 20, 2019

(54) DYNAMIC TRANSPARENT PROVISIONING OF RESOURCES FOR APPLICATION SPECIFIC RESOURCES

(71) Applicant: International Business Machines Corporation, Armonk, NY (US)

(72) Inventors: John A. Bivens, Ossining, NY (US); Michele M. Franceschini, White Plains, NY (US); Ashish Jagmohan, Irvington, NY (US); Valentina Salapura, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 14 days.

(21) Appl. No.: 14/867,217

(22) Filed: Sep. 28, 2015

(65) Prior Publication Data

US 2017/0090992 A1    Mar. 30, 2017

(51) Int. Cl.
*G06F 9/50* (2006.01)
*G06F 9/455* (2018.01)

(52) U.S. Cl.
CPC ........ *G06F 9/5077* (2013.01); *G06F 9/45558* (2013.01); *G06F 9/5072* (2013.01);
(Continued)

(58) Field of Classification Search
CPC ...... G06F 9/50; G06F 9/5077; G06F 9/45558; G06F 2009/45595; G06F 2009/4557; G06F 9/5072; H04L 41/0893; H04L 47/70

See application file for complete search history.

(56) References Cited

U.S. PATENT DOCUMENTS 6,253,257 B1 * 6/2001 Dundon .............. G06F 9/44521
                                                   719/328
6,393,026 B1 * 5/2002 Irwin ...................... H04L 45/00
                                                   370/394

(Continued)

FOREIGN PATENT DOCUMENTS

EP          2595346 A1    5/2013
JP       2013109640 A    6/2013
              (Continued)

OTHER PUBLICATIONS

Bacigalupo et al, Resource Management of Enterprise Cloud Systems Using Layered Queuing and Historical Performance Models, 2010, IEEE, pp. 1-8.*

(Continued)

*Primary Examiner* — Abu Zar Ghaffari
(74) *Attorney, Agent, or Firm* — Michael A. Petrocelli (57) ABSTRACT

A system and method dynamically provisions resources in a virtual environment. A current resource requirement is determined based on a current workload demand using one or more computer systems providing resources and access to the resources. The method and system includes comparing the current resource requirement with a current resource allocation using an engine communicating with resources. The engine is configured to allocate the resources, and the engine determines the resource requirement responsive to communications with a plurality of library instances. The library exposes a single-node interface for use by a user-application. The current resource allocation is modified based on the comparison of the current resource requirement with the current resource allocation, and in response to the current resource requirement, using the engine.

17 Claims, 6 Drawing Sheets

(52) U.S. Cl.
CPC .............. *G06F 2009/4557* (2013.01); *G06F 2009/45595* (2013.01)

(56) References Cited

U.S. PATENT DOCUMENTS

| | | | |
|---|---|---|---|
| 7,340,747 B1* | 3/2008 | Zeliger | G06F 9/465 709/203 |
| 7,665,064 B2* | 2/2010 | Able | G06F 17/30861 717/117 |
| 8,136,092 B2* | 3/2012 | Deedwaniya | G06F 9/44521 717/122 |
| 8,296,434 B1* | 10/2012 | Miller | H04L 67/1029 709/220 |
| 8,504,443 B2 | 8/2013 | Ferris et al. | |
| 8,849,891 B1* | 9/2014 | Suchter | G06F 9/5038 709/202 |
| 8,924,562 B2* | 12/2014 | Sartini | G06F 9/50 709/217 |
| 9,098,349 B2* | 8/2015 | Gerovac | G06F 9/5083 |
| 2004/0034825 A1* | 2/2004 | Jeddeloh | G11C 29/44 714/733 |
| 2005/0050084 A1* | 3/2005 | Atm | G06F 9/4426 |
| 2006/0059287 A1* | 3/2006 | Rivard | G06F 9/4411 710/300 |
| 2009/0271472 A1* | 10/2009 | Scheifler | G06F 9/485 709/202 |
| 2009/0288084 A1* | 11/2009 | Astete | G06F 9/45533 718/1 |
| 2011/0047352 A1* | 2/2011 | Ganfield | G06F 12/0817 712/29 |
| 2011/0055377 A1* | 3/2011 | Dehaan | G06F 9/4856 709/224 |
| 2011/0145392 A1 | 6/2011 | Dawson et al. | |
| 2011/0277027 A1* | 11/2011 | Hayton | H04L 63/0815 726/8 |
| 2012/0066395 A1* | 3/2012 | Ellis | G06F 9/5072 709/226 |
| 2012/0246638 A1* | 9/2012 | He | G06F 9/45558 718/1 |
| 2012/0254345 A1* | 10/2012 | Montoya | G06F 11/2294 709/217 |
| 2012/0260259 A1* | 10/2012 | Parthasarathy | G06F 9/5005 718/104 |
| 2012/0311012 A1 | 12/2012 | Mazhar et al. | |
| 2012/0311157 A1 | 12/2012 | Erickson et al. | |
| 2013/0019015 A1 | 1/2013 | Devarakonda et al. | |
| 2013/0055251 A1 | 2/2013 | Anderson et al. | |
| 2013/0060945 A1 | 3/2013 | Allam et al. | |
| 2013/0080642 A1 | 3/2013 | Adam et al. | |
| 2013/0138806 A1 | 5/2013 | Gohad et al. | |
| 2013/0139152 A1 | 5/2013 | Chang et al. | |
| 2013/0173803 A1* | 7/2013 | Pijewski | G06F 9/5072 709/226 |
| 2013/0219523 A1* | 8/2013 | Singh | G06F 9/443 726/30 |
| 2013/0232497 A1 | 9/2013 | Jalagam et al. | |
| 2013/0232498 A1 | 9/2013 | Mangtani et al. | |
| 2013/0290539 A1 | 10/2013 | Kodialam et al. | |
| 2013/0290543 A1 | 10/2013 | Lochhead et al. | |
| 2014/0053167 A1* | 2/2014 | Zhang | G06F 9/44 719/328 |
| 2014/0108663 A1* | 4/2014 | Peters | H04L 47/70 709/226 |
| 2014/0245319 A1* | 8/2014 | Fellows | G06F 9/5072 718/104 |
| 2014/0280964 A1* | 9/2014 | Farooq | G06Q 30/0631 709/226 |
| 2014/0282188 A1* | 9/2014 | Hathaway | G06F 8/34 715/771 |
| 2014/0282586 A1* | 9/2014 | Shear | G06F 9/5072 718/104 |
| 2014/0297830 A1* | 10/2014 | Lee | H04L 67/1002 709/223 |
| 2014/0298325 A1* | 10/2014 | Husar | G06F 9/54 718/1 |
| 2014/0365662 A1* | 12/2014 | Dave | H04L 67/10 709/226 |
| 2015/0365351 A1* | 12/2015 | Suit | G06F 9/45558 709/226 |
| 2016/0179560 A1* | 6/2016 | Ganguli | G06F 9/45558 718/1 |

FOREIGN PATENT DOCUMENTS

| | | |
|---|---|---|
| WO | 2008118464 A1 | 10/2008 |
| WO | 2011067782 A1 | 6/2011 |

OTHER PUBLICATIONS

Deng et al, Exploring Portfolio Scheduling for Long-term Execution of Scientific Workloads in IaaS Clouds, 2013, ACM, SC13, pp. 1-12.*

Gong et al, An Adaptive Control Strategy for Resource Allocation of Service-based Systems in Cloud Environment, 2015, IEEE, pp. 32-39.*

ControlByNet, "Video Surveillance in the CLOUD . . . no video stored at your site", 2015 www.controlbynet.com/ pp. 1-2.

Iveda®, "Sentir™, Cloud Video Surveillance Management Platform"www.iveda.com/, 2015, pp. 1-3.

Camba.tv, "An End to End Provider in Security Systems", camba.tv/, 2014, pp. 1-2.

Eyecast™, Powering Visual Surveillance, "Products", 2011, www.ocpinc.net/products.html pp. 1-2.

Takahashi, "DEMO: Third Iris lowers cost of Video surveillance by shifting processing to the cloud", Sep. 22, 2009, venturebeat.com/2009/09/22/demo-third-iris-lowers-cost-of-video-surveillance-by-shifting-processing-to-the-cloud/, pp. 1-4.

Meng et al., "Efficient Resource Provisioning in Compute Clouds via VM Multiplexing", ICAC '10, Jun. 7-11, 2010, pp. 11-20.

Buyya et al., "InterCloud: Utility-Oriented Federation of Cloud Computing Environments for Scaling of Application Services", Algorithms and Architectures for Parallel Processing, pp. 13-31, Springer Berlin Heidelberg, 2010.

Calheiros et al., "CloudSim: a toolkit for modeling and simulation of cloud computing environments and evaluation of resource provisioning algorithms", Software—Practice and Experience: 2011, vol. 41, pp. 23-50, Published online Aug. 24, 2010.

Mell et al., "The NIST Definition of Cloud Computing", Recommendations of the National Institute of Standards and Technology, NIST Special Publication 800-145, Sep. 2011, 7 pages.

* cited by examiner

DYNAMIC TRANSPARENT PROVISIONING OF RESOURCES FOR APPLICATION SPECIFIC RESOURCES

BACKGROUND

The present disclosure relates to a method and system for dynamically provisioning resources in a virtual environment. Computing resources can be provisioned to meet user objectives using a network or the Internet. In an example, streaming video can be provided as a service. Dynamic resource provisioning for streaming data on demand can be provided. For example, large amount of video data can streamed depending on the number of users at any given time. The number of users can vary according to need during the time of day, days of the week, or time of year. A peak usage time can require large amounts of available resources, however, outside the peak usage time, a large amount of provisioned resources can be idle.

SUMMARY

According to an aspect of the invention, a computer implemented method for dynamically provisioning resources in a virtual environment, includes determining a current resource requirement based on a current workload demand using one or more computer systems providing resources and access to the resources. The method and system includes comparing the current resource requirement with a current resource allocation using an engine communicating with resources. The engine is configured to allocate the resources, and the engine determines the resource requirement responsive to communications with a plurality of library instances. The library exposes a single-node interface for use by a user-application. The current resource allocation is modified based on the comparison of the current resource requirement with the current resource allocation, and in response to the current resource requirement, using the engine.

In another aspect according to the invention, a computer program product dynamically provisions resources in a virtual environment. The computer program product comprises a computer readable storage medium having program instructions embodied therewith, wherein the computer readable storage medium is not a transitory signal per se, the program instructions executable by a computer to cause the computer to perform a method. The method includes: determining a current resource requirement based on a current workload demand using one or more computer systems providing resources and access to the resources. The current resource requirement is compared with a current resource allocation using an engine communicating with resources. The engine is configured to allocate the resources, and the engine determines the resource requirement responsive to communications with a plurality of library instances. The library exposes a single-node interface for use by a user-application. The method further includes modifying the current resource allocation based on the comparison of the current resource requirement with the current resource allocation, and in response to the current resource requirement, using the engine.

In another aspect according to an embodiment of the invention, a computer system dynamically provisions resources in a virtual environment, the computer system comprises: one or more computer processors, one or more computer-readable storage media, and program instructions stored on one or more of the computer-readable storage media for execution by at least one of the one or more processors, the program instructions, including: determining a current resource requirement based on a current workload demand using one or more computer systems providing resources and access to the resources. The current resource requirement is compared with a current resource allocation using an engine communicating with resources. The engine is configured to allocate the resources, and the engine determines the resource requirement responsive to communications with a plurality of library instances. The library exposes a single-node interface for use by a user-application. The method further includes modifying the current resource allocation based on the comparison of the current resource requirement with the current resource allocation, and in response to the current resource requirement, using the engine.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawings are described below.

DETAILED DESCRIPTION

Figure 1:
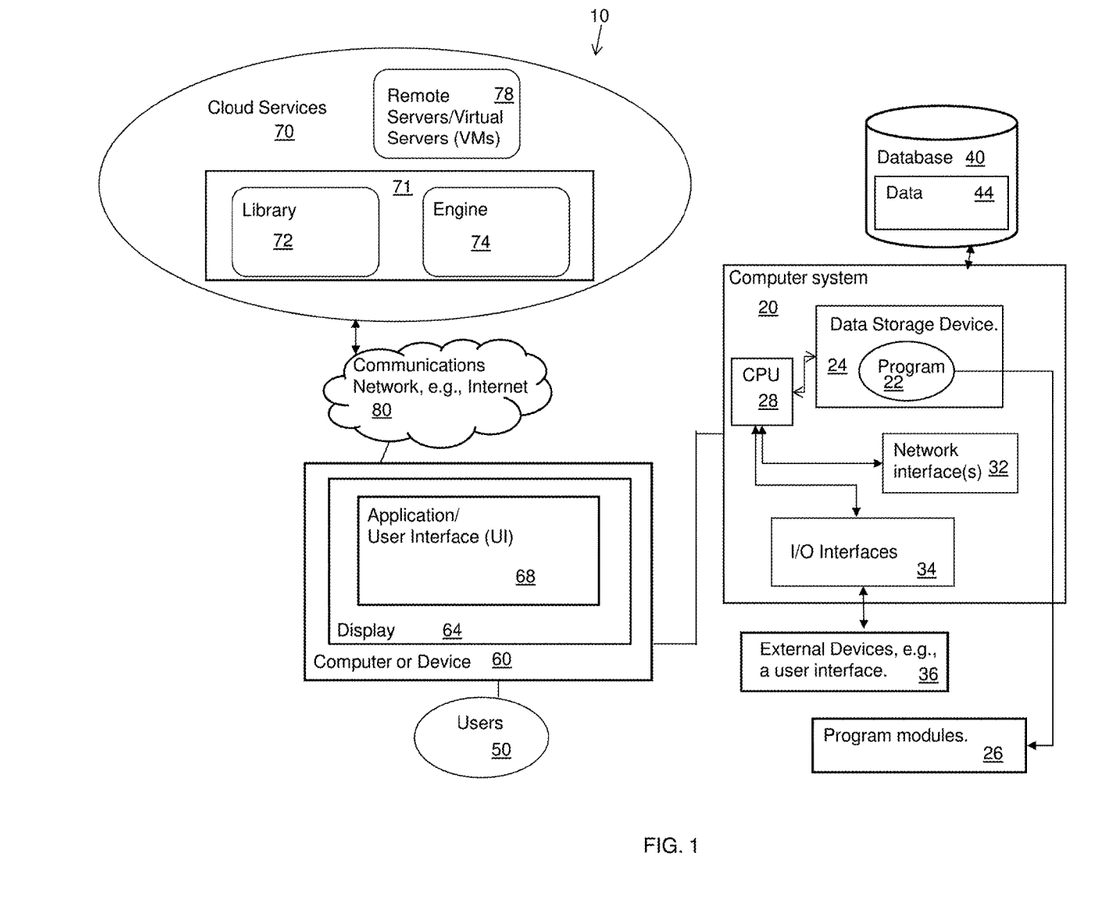
FIG. 1 is a schematic block diagram illustrating an overview of a system and methodology for dynamically provisioning resources in a virtual environment according to an embodiment of the present disclosure.
Figure 2:
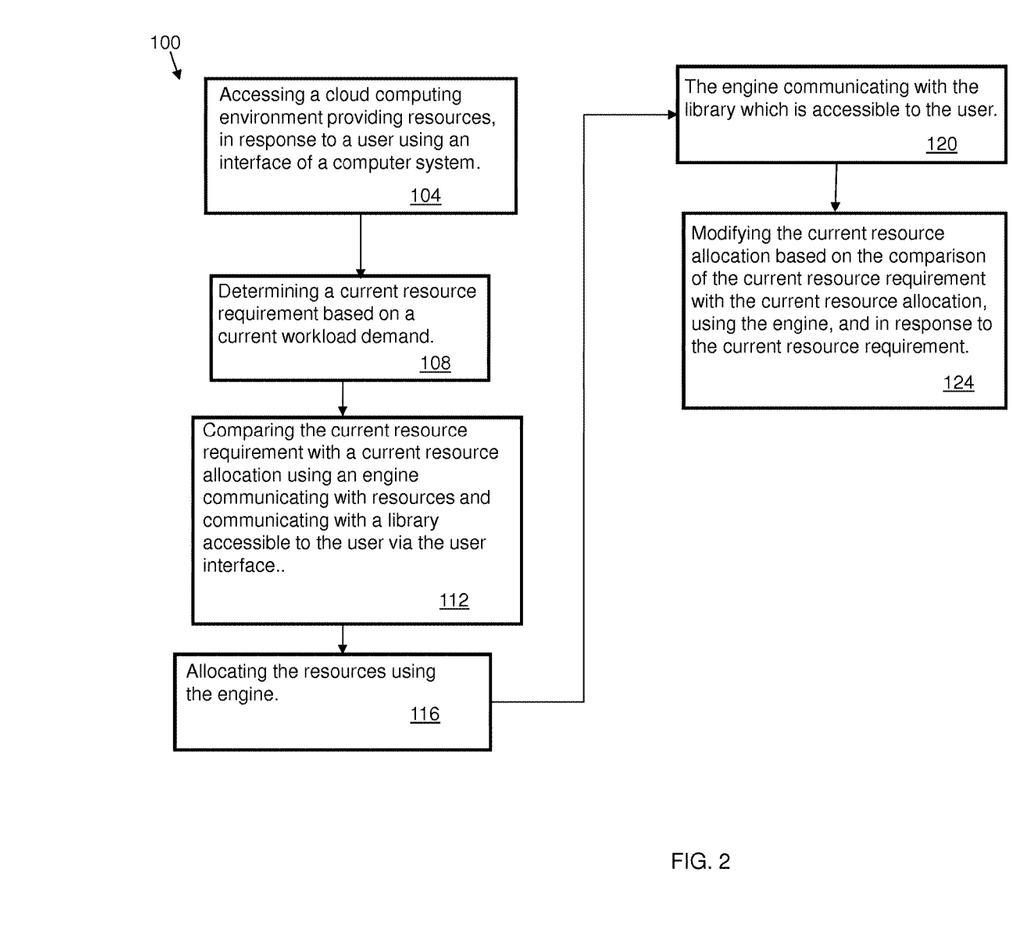
FIG. 2 is a flow chart illustrating a method for dynamically provisioning resources in a virtual environment according to an embodiment of the present disclosure.

Referring to FIGS. 1 and 2, a high level discussion of an embodiment of the disclosure includes, for example, a system 10 and method 100 for dynamically provisioning resources in a virtual environment. The virtual environment can be cloud based. A user 50 can access remote service such as cloud services 70 using a computer or device 60. The cloud services 70 include, for example, remote servers and virtual servers 78, thereby providing a virtual environment. The user's device 60 includes a display 64 for displaying an application or user interface (UI) 68. The user interface 68 can be used by the user to access and navigate the cloud services. The device 60 can access the cloud services 70 using a communications network 80, in one example including the Internet.

A computer system 20 and program 22 shown in FIG. 1 are generic representations of a computer and program that may be local to a user, or provided as a remote service, such as a website accessible using a network 80 (e.g., the Internet or cloud services). It is understood that the computer 20 also generically represent herein a computer device such as one or more servers, alone or as part of a datacenter, or a device such as a hand held device or personal data assistant. The computer system 20 can include a network interface 32, and input/output (I/O) interface(s) 34. The I/O interface 34 allows for input and output of data with an external device 36 that may be connected to the computer system. The network interface 32 may provide communications between the computing device and a computer network. The method steps and system components and techniques may be embodied in modules of the program 22 for performing the tasks of each of the steps of the method and system, which are generically represented in FIG. 1 as program modules 26. The program 22 and program modules 26 can execute specific steps, routines, sub-routines, instructions or code, of the program. The method 100 may be embodied in a program 22 embodied on a computer readable storage device, e.g., data storage device 24, which is executable by a processor 28 of the computer 20 (i.e., execute program steps, code, or program code). Data storage may also be embodied as a database 40 and data 44. The program or executable instructions therefrom, may be offered as a service by a provider.

Figure 4:
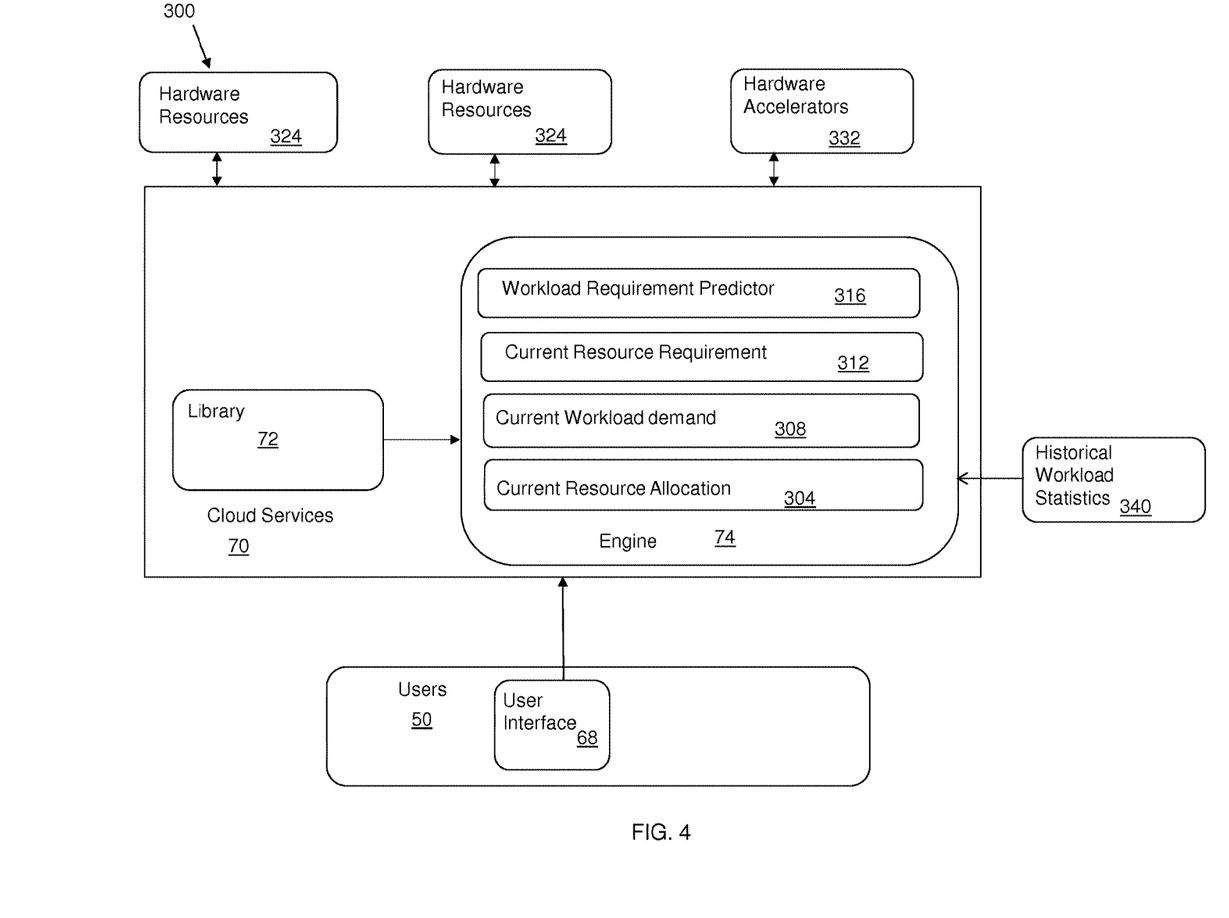
FIG. 4 is a schematic block diagram depicting the functionality of a system according to an embodiment of the present disclosure relating to FIGS. 1, 2 and 3.

Referring to FIGS. 1 and 2, an embodiment according to the present disclosure, the computer implemented method 100 dynamically provisions resources in a virtual environment. A functional system 300 is shown in FIG. 4 which is based on the system 10 and method 100 shown in FIGS. 1 and 2, respectively. The method includes accessing a cloud computing environment, e.g., cloud services 70, in response to a user 50 using an interface 68 of a computer system or device 60, as in block 104. The method 100 includes determining a current resource requirement 312 (FIG. 4) based on a current workload demand 308 (FIG. 1), as in block 108. In the embodiment of the present disclosure shown in FIG. 1, cloud based computer services provide resources and access to the resource in cooperation with the user interface 68.

For example, resources can include server availability, VM availability, wherein the servers provide streaming of video or resources, as well as bandwidth availability for a user. A current resource requirement is based on a current workload demand which can include a requirement of VMs or a resource demand such as current video streaming demands by a user.

The method 100 includes comparing the current resource requirement with a current resource allocation 304 (FIG. 4), using an engine 74 (FIG. 1) communicating with resources, as in block 112. The engine determines the resource requirement responsive to communications with a plurality of library instances (e.g., current uses or accesses of the library). The library exposes a single-node interface for use by a user-application (e.g., user application 68). For example, the current resource allocation can include resources provided such as servers, VMs, and bandwidth for streaming services. The engine also communicates with a library 72 (FIG. 1) accessible to the user via the user interface (block 112). The user interface and library being available to the user to request resources, for example, the user interface can include access to the library.

In one embodiment, the engine can be an application or software provided in a cloud layer, e.g., a provisioning layer of the cloud. The engine 74 can also be referred to as a dynamic provisioning engine. In one embodiment, the engine can be also include a dynamic provisioning engine and a workload requirement predictor 316 (FIG. 4). The workload requirement predictor can forecast trends within time periods for attributes of resources using regression techniques and historical data, to provide future resource requirements predictions, for example historical workload statistics 340. The provisioning engine can provide provisioning of resources as a cloud platform service. The provisioning engine can map predicted attributes to abstracted hardware resources. For instance predicting cost of attributes, and using optimization formulations to map predicted attributes to abstracted hardware resources. Predicted resources can be measured against hardware attributes that are available to determine a best use of available resources. Resources include hardware 324, such as servers, VMs, bandwidth for streaming resources, and hardware accelerators 332.

Specialized hardware can be specified and used, for example hardware accelerators, can be provided to improve a speed of services provided by the current resources. The hardware accelerators can be allocated by the engine to modify a current resource allocation to meet a present or current workload demand. In an exemplary embodiment, the service provided by the library is a video compression/decompression service, and the engine can allocate specialized hardware in the form of GPUs to improve quality of service, efficiency, and performance. In another embodiment, the engine can allocate specialized hardware in the form of FPGA-based accelerators or other programmable accelerators. In another embodiment the service provided is the ability to train a deep neural net.

The engine is configured to allocate the resources, as in block 116. The resources can include VMs, ultimately relying on hardware resources.

The engine communicates with the library which is accessible to the user in block 120. The library can be an application or a part of an application accessible to the user and providing a user interface to the user. The engine operates transparently to the user and provides the dynamic provisioning. The interface and the library enable the user to initiate an action that invokes the engine which dynamically provides the resources. The user can initiate a video related application which may include streaming, or storage requirements, or data compression, or video processing or data streaming using the interface. The initiated action is scalable, transparently to the user, using the engine of the present disclosure.

The method 100 includes modifying the current resource allocation based on the comparison of the current resource requirement with the current resource allocation, using the engine, as in block 124. Thus, the engine modifies the current resource allocation by either adding or taking away resources such as VMs.

The current resource requirements includes an amount of resource available to a user, and can include resources such as servers, VMs, and bandwidth adjustments. The workload demand can include a total number of resources requested or accessed by a number of users at a given or specified time or time period. In one instance, the library and the engine of the present disclosure can be in a cloud dynamic transport provisioning layer of a cloud computing environment.

The library presents an interface to user applications that is consistent with single node implementation of similar functionalities. For example, a video compression library implementation would send a group of pictures to be compressed the same way a standard single node video compression library does. The library connects to the engine in a transparent way, and conveys to the engine information sufficient to both perform the task and to estimate which resources are required for performing the task. The engine has a global view of the requests from all library instances in the system (e.g., uses or accesses of the library) and uses this information to estimate resources to be allocated. In one embodiment, the current global amount of pictures to be compressed is used to estimate resource requirements such as the number of VMs to be used to performing the compression task. The decision on the resources to be allocated takes into account system costs, current utilization of the pool of resources by other services, etc.

Figure 3:
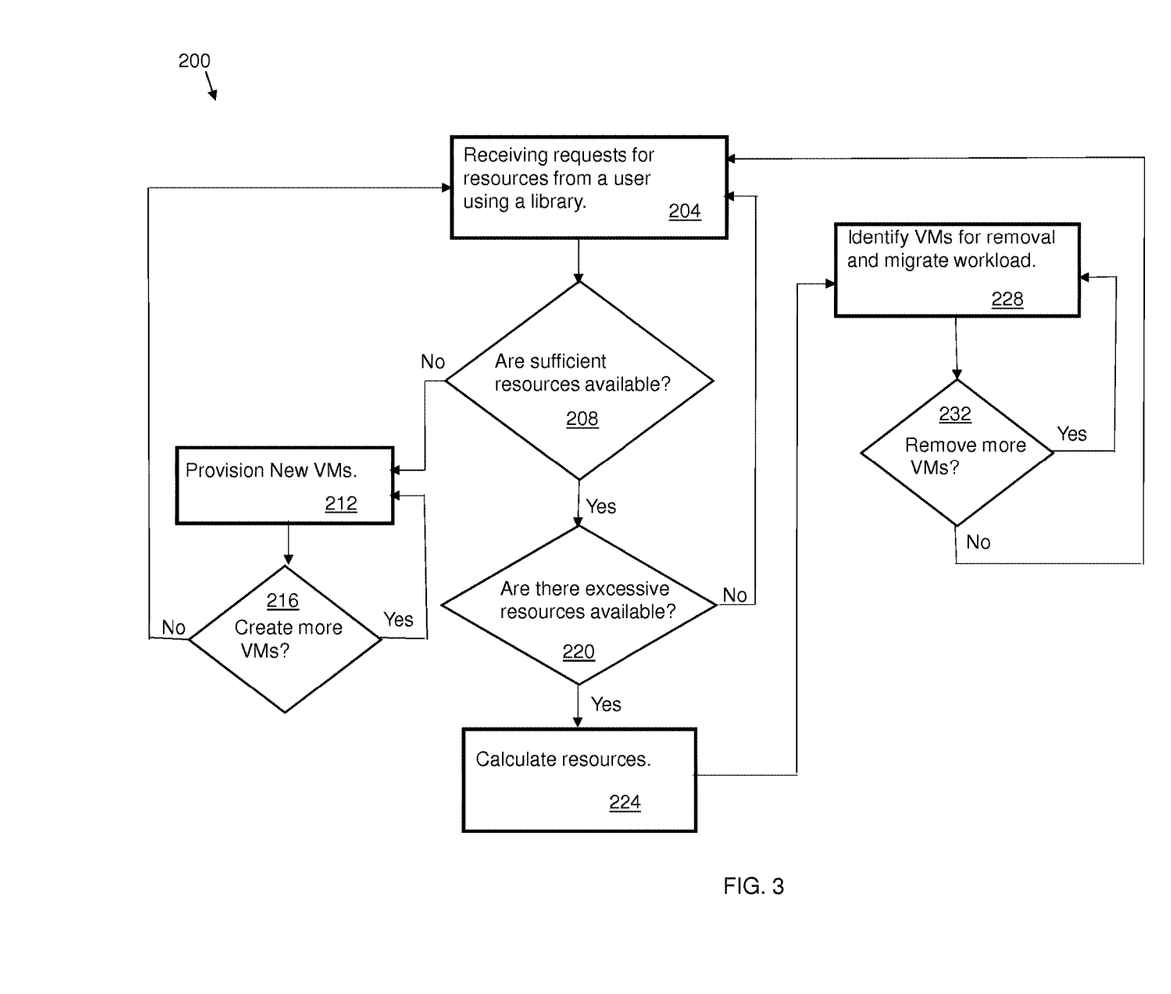
FIG. 3 is a flow chart illustrating a further exemplary method according to an embodiment of the present disclosure.

Referring to FIG. 3, in one embodiment according to the present disclosure, a method 200 for controlling the flow of resources for the cloud based environment shown in FIG. 1, includes receiving requests for resources from a user 50 using a library 72, in block 204. The library can be part of a user interface or vice versa. The requests can be monitored to determine their type and the amount of requests using the library.

The method 200 determines whether sufficient resources are available, in block 208. If there are sufficient resource available, then the method proceeds to block 220. If there are not sufficient resources, the method proceeds to block 212 to provision new virtual machines (VMs). Block 216 determines if more VMs need to be created. If yes, the method returns to block 212 to provision more machines. If no more VMs are need, the method returns to block 204.

At block 220, the method determines if there are excessive resources. If not, the method returns to block 204 to receive requests. If there are excessive resources, the method continues to calculate resources in block 224. Resources, e.g., VMs, are identified for removal and their workload is migrated to other resources or VMs, as in block 228. In block 232, it is determined whether to remove more VMs. If more VMs need to be removed, the method returns to block 228 to identify VMs for removal. If no more VMs need to be removed, the method continues to block 204 to receive more requests for resources.

The present disclosure also provides a method and system for data streaming, for example, steaming videos where a varying number of streams are to be delivered depending on the number of users, and which can vary over time. The amount of resources needed to meet a demand can include a number of virtual machines, and performance which needs to be achieved, and can depend on a quantity and type of user requests.

A cloud computing dynamic transparent provisioning layer 71 (which can include both the library and engine of the present disclosure) can provision the optimal resources for the needed performance. The provisioning is transparent to the user, and does not require an application modification, such as the interface application the user can be accessing. The present disclosure provides the library to perform as a dynamic provisioning library and link to the engine to determine resource allocation. Thus, the provisioning is determined and initiated by the engine 74 which performs as a dynamic provisioning engine, responding to variation of workload demand, and allocating the number of provisioned VMs.

In one embodiment, hardware accelerators can be provisioned as needed to boost performance or meet a desired performance, and to provide resource allocation to meet resource requirements. In an exemplary embodiment, the service provided by the library is a video compression/decompression service, and the engine can allocate specialized hardware in the form of GPUs to improve quality of service, efficiency, and performance. In another embodiment, the engine can allocate specialized hardware in the form of FPGA-based accelerators or other programmable accelerators.

The present disclosure provides workload distribution which is transparent to the user, and can be dynamically based on the number and type of workload requests. A user application can interact or communicate with the library. The engine can ensure VMs are dynamically provisioned or removed based on a workload demand.

Explicit provisioning of VMs does not need to be implemented in the embodiments of the present disclosure. In one example, a client can be charged per service as opposed to per a provisioned VM.

The present disclosure allows a dynamic resource allocation to meet changing resource requirements based on workload demands. The method and system can reduce the number of active VMs when in relation to the demand for resources. In one example, reducing active VMs as needed enables cloud services to reduce hypervisor (or virtual machine monitor (VMM) overhead, and can free resources for other workloads in the cloud or cloud services. New VMs can be provisioned as needed, or stand-by VMs invoked.

The method and system of the present disclosure provides a cloud customer a library with an interface that can be used to access video processing and streaming functionalities. The library can leverage the cloud to provide transparent scalability capable of seamlessly providing resources. The resources can be provided within orders of magnitude of variation based on and accounting for traffic variations and varying workload requirements.

The method and system of the present disclosure can provide interfacing via an interface with low level cloud API (application programming interfaces), to provide automated scalable VM generation and workload dispatching.

Embodiments of the present disclosure can be provided using a specialized cloud layer which provides the capability of transparently provisioning resources needed based on workload requirements. Resources provided can include application specific cloud services, and particularly, resources for processing video data, such as, video streaming and video surveillance.

In one example, based on an actual or current workload, the library and engine according to the present disclosure can also provide specialized hardware (HW) (e.g., GPU (graphics processing unit)) transparently to a user. GPU accelerated computing can include a GPU and CPU (central processing unit) working in concert to accelerate analytics, processing, and analysis. Specialized hardware can enhance, for example, video transcoding (for example, in-flight, stored, or cached), video streaming (e.g., stream matched to characteristics of receiving device), and enterprise software or enterprise application software (EAS) integration.

In one embodiment according to the present disclosure, the method 100 may be embodied in a program 22 (FIG. 1) embodied on a computer readable storage device, e.g., data storage device 24, as shown in FIG. 1. The program 22 is executable by a processor 28 of a computer system 20 (to execute program steps, code, or program code). Additional data storage may also be embodied as a database 40 including data 44. The program or executable instructions may be offered as a service by a provider. The computer 20 and program 22 shown in FIG. 1 are generic representations of a computer and program that may be local to a user, or provided as a remote service, such as website accessible using a network (e.g., interacting with the Internet or cloud services). It is understood that the computer 20 also generically represents herein a computer device or a computer included in a device, such as a laptop or desktop computer, etc., or one or more servers, alone or as part of a datacenter. The computer system 20 can include a network interface 32, and input/output (I/O) interface(s) 34. The I/O interface 34 allows for input and output of data with an external device 36 that may be connected to the computer system. The network interface 32 may provide communications between the computer system and a computer network. The method steps and system components and techniques may be embodied in modules of the program 22 for performing the tasks of each of the steps of the method and system, which are generically represented in FIG. 1 as program modules 26. The program 22 and program modules 26 can execute specific steps, routines, sub-routines, instructions or code, of the program. The method of the present disclosure can be run locally on a device such as the mobile device, or can be run a service, for instance, on a remote server 78 which is accessed using the communications network 80.

Referring to FIG. 1, the computer system 20 is shown as a general purpose computing device, which can also be embodied as a server, and the server can be a cloud computing node. The components of the computer system may include, but are not limited to, one or more processors or processing units, a system memory, and a bus that couples various system components, for example, a system memory to a processor. A bus can include several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system can include a variety of computer system readable media. Such media may be any available media that is accessible by computer system/server, and it includes both volatile and non-volatile media, removable and non-removable media.

System memory can include computer system readable media in the form of volatile memory, such as random access memory (RAM) and/or cache memory. The computer system may further include other removable/non-removable, volatile/non-volatile computer system storage media. By way of example only, a storage system can be provided for reading from and writing to a non-removable, non-volatile magnetic media (e.g., a hard drive). Although not shown, a magnetic disk drive for reading from and writing to a removable, non-volatile magnetic disk (e.g., a floppy disk), and an optical disk drive for reading from or writing to a removable, non-volatile optical disk such as a CD-ROM, DVD-ROM or other optical media can be provided. In such instances, each can be connected to a bus by one or more data media interfaces. As will be further depicted and described below, memory may include at least one program product having a set (e.g., at least one) of program modules that are configured to carry out the functions of embodiments of the invention.

A program can have a set (at least one) of program modules, and may be stored in memory, as well as, for example, an operating system, one or more application programs, other program modules, and program data. Each of the operating system, one or more application programs, other program modules, and program data or some combination thereof, may include an implementation of a networking environment. Program modules can carry out functions and/or methodologies of embodiments of a program.

The computer system may also communicate with one or more external devices such as a keyboard, a pointing device, and a display; and one or more devices that enable a user to interact with computer system/server; and/or any devices (e.g., network card, modem, etc.) that enable the computer system to communicate with one or more other computing devices. Such communication can occur via Input/Output (I/O) interfaces. The computer system can communicate with one or more networks such as a local area network (LAN), a general wide area network (WAN), and/or a public network (e.g., the Internet) via network adapter. The network adapter can communicate with the other components of computer system/server via a bus. It should be understood that although not shown, other hardware and/or software components could be used in conjunction with the computer system. Examples, include, but are not limited to: microcode, device drivers, redundant processing units, external disk drive arrays, RAID systems, tape drives, and data archival storage systems, etc.

It is understood that a computer or a program running on the computer may communicate with a server computer via a communications network. The communications network may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++ or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
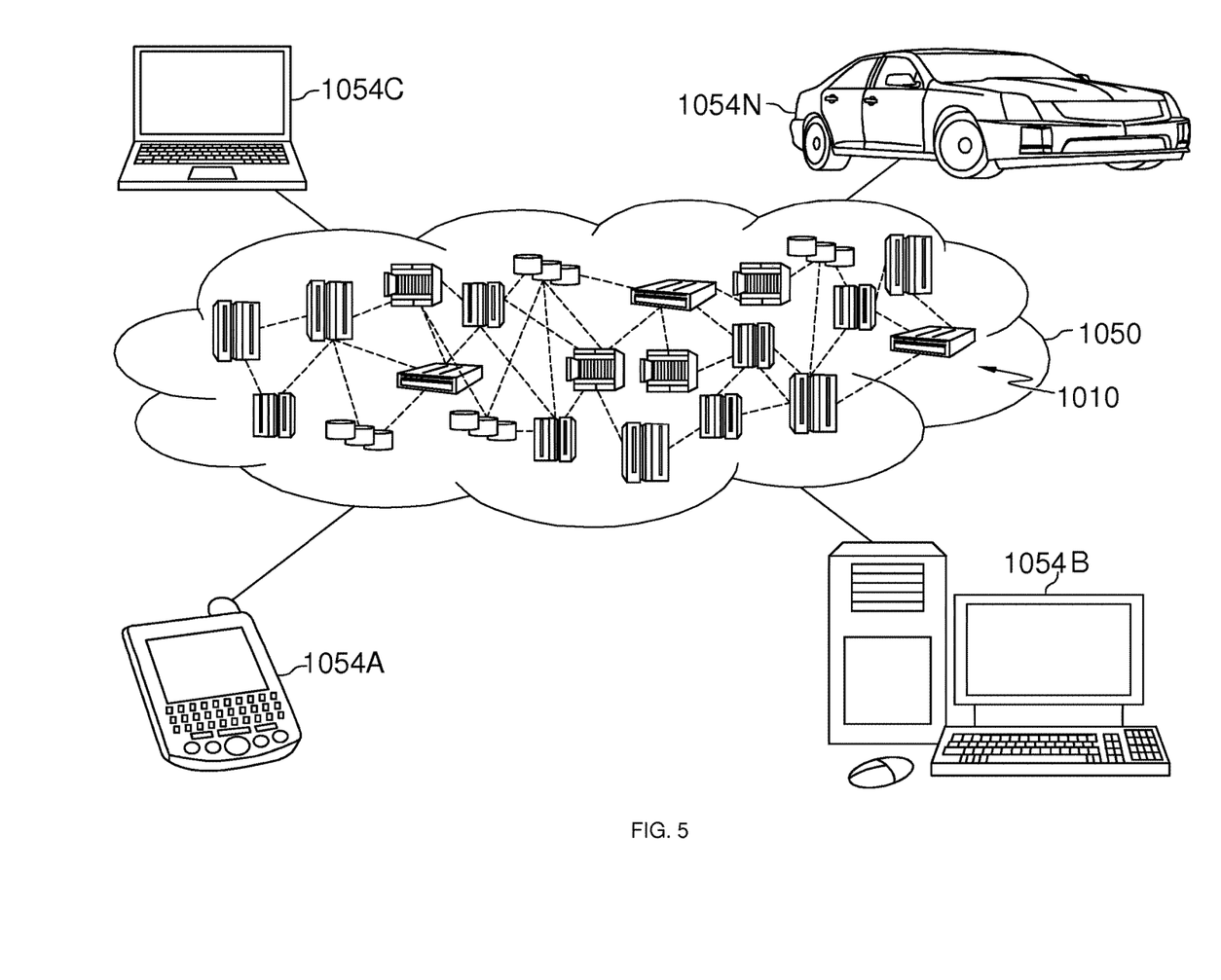
FIG. 5 is a block diagram which depicts a cloud computing environment according to an embodiment of the present disclosure.
Figure 6:
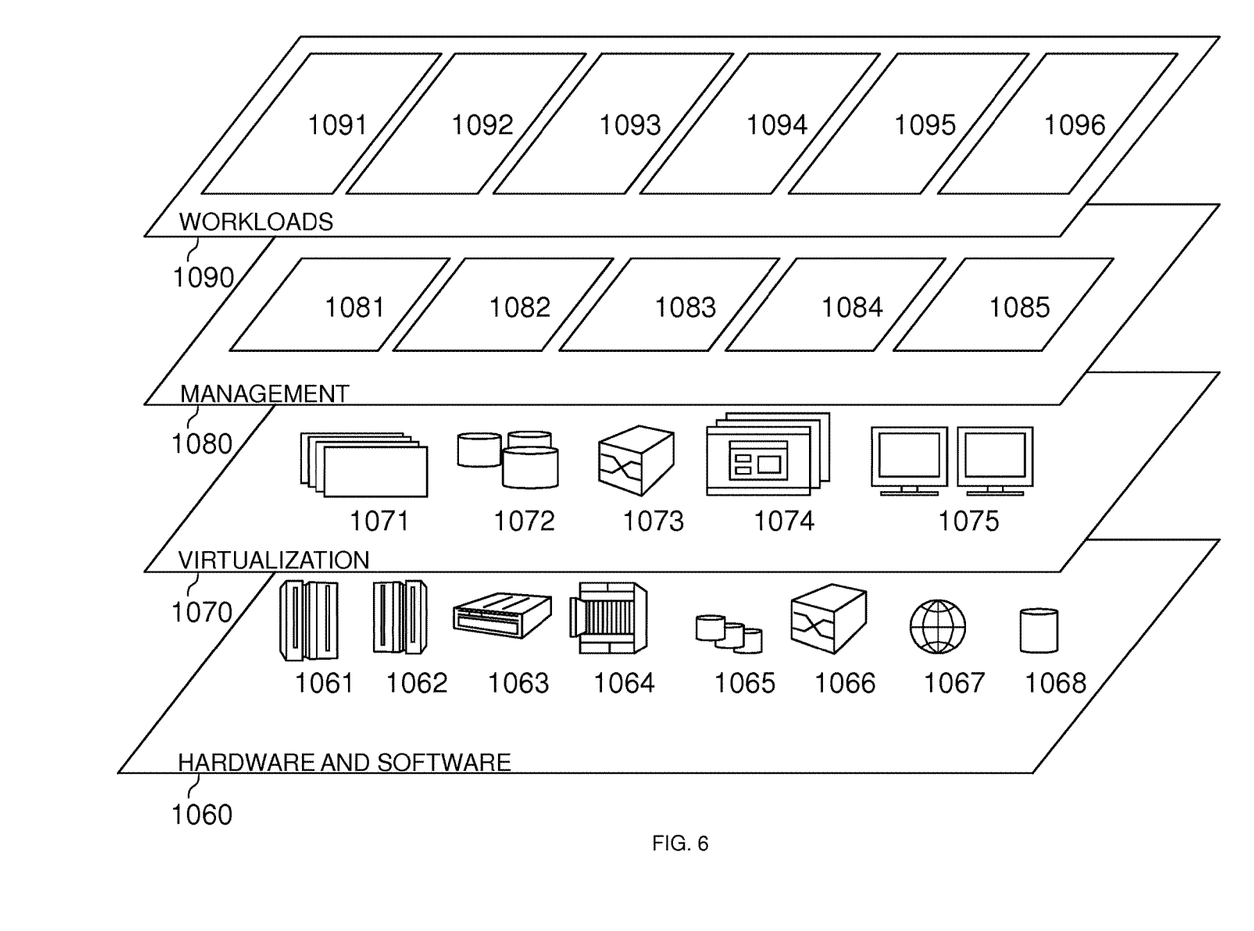
FIG. 6 is a schematic block diagram which depicts abstraction model layers according to an embodiment of the present disclosure.

Referring now to FIGS. 5 and 6, illustrative cloud computing environment 1050 is depicted. As shown, cloud computing environment 1050 comprises one or more cloud computing nodes 1010 with which local computing devices used by cloud consumers, such as, for example, personal digital assistant (PDA) or cellular telephone 1054A, desktop computer 1054B, laptop computer 1054C, and/or automobile computer system 1054N may communicate. Nodes 1010 may communicate with one another. They may be grouped (not shown) physically or virtually, in one or more networks, such as Private, Community, Public, or Hybrid clouds as described hereinabove, or a combination thereof. This allows cloud computing environment 1050 to offer infrastructure, platforms and/or software as services for which a cloud consumer does not need to maintain resources on a local computing device. It is understood that the types of computing devices 1054A-N shown in FIG. 5 are intended to be illustrative only and that computing nodes 1010 and cloud computing environment 1050 can communicate with any type of computerized device over any type of network and/or network addressable connection (e.g., using a web browser).

Referring now to FIG. 6, a set of functional abstraction layers provided by cloud computing environment 1050 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized.

Examples of workloads and functions which may be provided from this layer include: mapping and navigation 1091; software development and lifecycle management 1092; virtual classroom education delivery 1093; data analytics processing 1094; transaction processing 1095; and provisioning cloud services or application specific cloud service 1096.

The embodiments, features, and instructive examples described above are illustrative, and should not be construed to limit the present disclosure to the particular embodiments or enumerated examples. Thus, various changes and modifications may be effected by one skilled in the art without departing from the spirit or scope of the disclosure as defined in the appended claims.

What is claimed is:

1. A computer implemented method for dynamically provisioning resources in a virtual environment, comprising:
   determining a current resource requirement using an engine based on a current workload demand, the current workload demand using one or more computer systems providing resources and access to the resources;
   determining a new resource requirement using the engine and in response to communications with a library, the communications including a plurality of library instances of accessing the library, wherein the plurality of library instances access the resources using the engine, the library exposing a single-node interface for use by a user-application for accessing the library, each accessing of the library including accessing the resources using the engine, the single-node interface communicating with the engine, the engine and the library being remote from the user-application, and the engine and the library being available to a plurality of users via the single-node interface;
   comparing the new resource requirement with a current resource allocation of the current resource requirement using the engine communicating with the resources, the engine being configured to allocate the resources;
   modifying, using the engine, the current resource allocation based on the comparison of the current resource allocation with the new resource requirement to dynamically provision a new resource allocation in response to the user-application accessing the library, the user-application accessing the library in response to the single-node interface receiving a request for resources initiated by a user; and
   dynamically providing the new resource allocation by the engine based on the request for resources, wherein the current workload demand includes a number of users requiring the resources, and wherein the library and the engine are in a dynamic transport provisioning layer of a cloud based environment.

2. The method of claim 1, wherein the current resource requirement and the new resource requirement each include an amount of resources, respectively.

3. The method of claim 1, wherein the current resource requirement includes an amount of virtual machines (VMs).

4. The method of claim 1, wherein the engine provides specified hardware to modify the current resource allocation.

5. The method of claim 4, wherein the specified hardware includes hardware accelerators.

6. The method of claim 1, wherein the virtual environment is the cloud based environment.

7. The method of claim 1, wherein a resource is for processing video data which includes video streaming, initiated by the user-application in response to the request for resources by the user.

8. A computer program product for delegating authority on an online account, the computer program product comprising a computer readable storage medium having program instructions embodied therewith, wherein the computer readable storage medium is not a transitory signal per se, the program instructions executable by a computer having a processor to cause the computer to perform a method, comprising:
   determining a current resource requirement using an engine based on a current workload demand, the current workload demand using one or more computer systems including the computer and the processor for executing the program instruction, the one or more computer systems providing resources and access to the resources;
   determining a new resource requirement using the engine and in response to communications with a library, the communications including a plurality of library instances of accessing the library, wherein the plurality of library instances access the resources using the engine, the library exposing a single-node interface for use by a user-application for accessing the library, each accessing of the library including accessing the resources using the engine, the single-node interface communicating with the engine, the engine and the library being remote from the user-application, and the engine and the library being available to a plurality of users via the single-node interface;
   comparing the new current resource requirement with a current resource allocation of the current resource requirement using the engine communicating with the resources, the engine being configured to allocate the resources;
   modifying, using the engine, the current resource allocation based on the comparison of the current resource allocation with the new resource requirement to dynamically provision a new resource allocation in response to the user-application accessing the library, the user-application accessing the library in response to the single-node interface receiving a request for resources initiated by a user; and
   dynamically providing the new resource allocation by the engine based on the request for resources, wherein the current workload demand includes a number of users requiring the resources, and wherein the library and the engine are in a dynamic transport provisioning layer of a cloud based environment.

9. The product of claim 8, wherein the current resource requirement and the new resource requirement each include an amount of resources, respectively.

10. The product of claim 8, wherein the current resource requirement includes an amount of virtual machines (VMs).

11. The product of claim 8, wherein the engine provides specified hardware to modify the current resource allocation.

12. The product of claim 11, wherein the specified hardware includes hardware accelerators.

13. The product of claim 8, wherein the virtual environment is the cloud based environment.

14. A computer system for delegating authority on an online account, the computer system comprising:
   one or more computer processors, one or more computer-readable storage media, and program instructions stored on one or more of the computer-readable storage media for execution by at least one of the one or more processors, the program instructions, comprising:
   determining a current resource requirement using an engine based on a current workload demand, the current workload demand using one or more computer systems providing resources and access to the resources;

determining a new resource requirement using the engine and in response to communications with a library, the communications including a plurality of library instances of accessing the library, wherein the plurality of library instances access the resources using the engine, the library exposing a single-node interface for use by a user-application for accessing the library, each accessing of the library including accessing the resources using the engine, the single-node interface communicating with the engine, the engine and the library being remote from the user application, and the engine and the library being available to a plurality of users via the single-node interface;

comparing the new resource requirement with a current resource allocation of the current resource requirement using the engine communicating with the resources, the engine being configured to allocate the resources;

modifying, using the engine, the current resource allocation based on the comparison of the current resource allocation with the new resource requirement to dynamically provision a new resource allocation in response to the user-application accessing the library, the user-application accessing the library in response to the single-node interface receiving a request for resources initiated by a user; and dynamically providing the new resource allocation by the engine based on the request for resources, wherein the current workload demand includes a number of users requiring the resources, and wherein the library and the engine are in a dynamic transport provisioning layer of a cloud based environment.

15. The computer system of claim 14, wherein the current resource requirement and the new resource requirement each include an amount of resources, respectively.

16. The computer system of claim 14, wherein the current resource requirement includes an amount of virtual machines (VMs).

17. A computer implemented method for dynamically provisioning resources in a virtual environment, comprising:

determining a current resource requirement using an engine based on a current workload demand, the current workload demand using one or more computer systems providing resources and access to the resources;

determining a new resource requirement using the engine and in response to communications with a library, the communications including a plurality of library instances of accessing the library, wherein the plurality of library instances access the resources using the engine, the library exposing a single-node interface for use by a user-application for accessing the library, each accessing of the library including accessing the resources using the engine, the single-node interface communicating with the engine, the engine and the library being remote from the user-application, and the engine and the library being available to a plurality of users via the single-node interface;

comparing the new resource requirement with a current resource allocation of the current resource requirement using the engine communicating with the resources, the engine being configured to allocate the resources;

modifying, using the engine, the current resource allocation based on the comparison of the current resource allocation with the new resource requirement to dynamically provision a new resource allocation in response to the user-application accessing the library, the user- application accessing the library in response to the single-node interface receiving a request for resources initiated by a user; and dynamically providing the new resource allocation by the engine based on the request for resources, wherein the library and the engine are in a dynamic transport provisioning layer of a cloud based environment, and wherein a resource is for processing video data which includes video streaming, initiated by the user-application in response to the request for resources by the user.

* * * * *